United States Patent
Lürken et al.

(10) Patent No.: US 9,506,681 B2
(45) Date of Patent: Nov. 29, 2016

(54) METHOD AND DEVICE FOR GENERATING A POSITIVE PRESSURE IN A TANK FOR LIQUEFIED GAS ON A REFRIGERATED VEHICLE AND A COOLING SYSTEM FOR A REFRIGERATED VEHICLE AND A REFRIGERATED VEHICLE

(75) Inventors: Franz Lürken, Kempten (DE); Helmut Henrich, Pulheim (DE); Reinhard Kost, Krefeld (DE)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 2357 days.

(21) Appl. No.: 12/296,389

(22) PCT Filed: Mar. 27, 2007

(86) PCT No.: PCT/IB2007/051443
§ 371 (c)(1),
(2), (4) Date: Jan. 26, 2009

(87) PCT Pub. No.: WO2007/116381
PCT Pub. Date: Oct. 18, 2007

(65) Prior Publication Data
US 2009/0178419 A1 Jul. 16, 2009

(30) Foreign Application Priority Data
Apr. 7, 2006 (DE) .................. 10 2006 016 555

(51) Int. Cl.
F17C 7/02 (2006.01)
F17C 9/02 (2006.01)
(Continued)

(52) U.S. Cl.
CPC ........... *F25D 3/105* (2013.01); *B60H 1/00014* (2013.01); *B60H 1/32* (2013.01); *B60H 1/3202* (2013.01); *B60P 3/20* (2013.01); *F25D 29/001* (2013.01); *F25D 2500/02* (2013.01)

(58) Field of Classification Search
CPC .. B61H 1/32; B61H 1/3202; B61H 1/00014; B60P 3/20; F25D 29/001; F25D 3/105
USPC .................. 62/50.1, 50.2, 50.4, 50.7, 48.1
See application file for complete search history.

(56) References Cited

U.S. PATENT DOCUMENTS 3,281,075 A   10/1966  Smyers, Jr.
3,803,859 A   4/1974   Kleffmann et al.
(Continued)

FOREIGN PATENT DOCUMENTS

EP   0 599 625   6/1994
EP   0 826 937   3/1998
(Continued)

OTHER PUBLICATIONS

International Search Report for PCT/IB2007/051443.

*Primary Examiner* — Henry Crenshaw
(74) *Attorney, Agent, or Firm* — Christopher J. Cronin

(57) ABSTRACT

The invention relates to a device and a method for generating a positive pressure in a tank for liquefied gas on a refrigerated vehicle with an evaporator for the liquefied gas, in conjunction with which the evaporator is connected in a fluid-conducting fashion to the tank via a line for liquefied gas, and in conjunction with which a valve is arranged in the line, comprising the following method steps: opening the valve so that liquefied gas exits from the tank and into the line; closing the valve in such a way that a quantity of the liquefied gas remains in the line and is able to flow back into the tank; heating the quantity in the line. The invention also relates to a method for the supply of liquefied gas, and a device for generating a positive pressure in a tank for liquefied gas in a cooling system, in conjunction with which the method according to the invention for generating a pressure is utilized. The invention permits a particularly efficient and reliable cooling of products in a refrigerated vehicle.

13 Claims, 12 Drawing Sheets

(51) Int. Cl.
  *F17C 9/04*   (2006.01)
  *F17C 13/00*  (2006.01)
  *F25D 3/10*   (2006.01)
  *B60H 1/32*   (2006.01)
  *B60P 3/20*   (2006.01)
  *F25D 29/00*  (2006.01)
  *B60H 1/00*   (2006.01)

(56) References Cited

U.S. PATENT DOCUMENTS

| | | | |
|---|---|---|---|
| 4,966,006 A * | 10/1990 | Thuesen et al. | 62/89 |
| 4,986,086 A | 1/1991 | De Langavant | |
| 5,169,031 A * | 12/1992 | Miller | 222/146.5 |
| 5,199,275 A * | 4/1993 | Martin | 62/275 |
| 5,365,744 A | 11/1994 | Viegas et al. | |
| 5,392,608 A * | 2/1995 | Lee | 62/611 |
| 5,660,046 A | 8/1997 | De Langavant et al. | |
| 2004/0055315 A1* | 3/2004 | Drube | 62/50.2 |

FOREIGN PATENT DOCUMENTS

| | | | |
|---|---|---|---|
| EP | 1 593 918 | 11/2005 | |
| GB | 1 173 478 | 12/1969 | |
| GB | 1 268 967 | 3/1972 | |
| GB | 2 275 098 | 8/1994 | |
| GB | 2275098 A * | 8/1994 | F25D 3/10 |
| WO | WO 01/53764 | 7/2001 | |

* cited by examiner

METHOD AND DEVICE FOR GENERATING A POSITIVE PRESSURE IN A TANK FOR LIQUEFIED GAS ON A REFRIGERATED VEHICLE AND A COOLING SYSTEM FOR A REFRIGERATED VEHICLE AND A REFRIGERATED VEHICLE

CROSS-REFERENCE TO RELATED APPLICATIONS

This application is a §371 of International PCT Application PCT/IB2007/051443, filed Mar. 27, 2007.

BACKGROUND

1. Field of the Invention

The invention relates to a method and a device for generating a positive pressure in a tank for liquefied gas on a refrigerated vehicle with an evaporator for the liquefied gas, in conjunction with which the evaporator is connected in a fluid-conducting fashion to the tank via a line for liquefied gas, and in conjunction with which a valve is arranged in the line; to a cooling system for a refrigerated vehicle and a refrigerated vehicle having at least one refrigerated chamber, a tank for liquefied gas and an evaporator for the evaporation of the liquefied gas and the delivery of cold to the refrigerated chamber, in conjunction with which the evaporator is connected in a fluid-conducting fashion to the tank via a line for liquefied gas, and in conjunction with which a valve is arranged in the line.

2. Related Art

For approximately 30 years, nitrogen has been used for the refrigeration of vehicles with multi-chamber systems. A method of this type is already familiar under the name CryogenTrans (CT). The CT method involves carrying nitrogen in liquid form at low temperature in a vacuum-insulated container on or in the vehicle. As and when cold is required, this nitrogen is drawn off via a pipe and is sprayed directly into the chamber to be refrigerated by the inherent pressure of the medium. The method is particularly simple and is immune to interference. What is more, the refrigerating capacity is always at the same level regardless of the ambient temperature. It is restricted in principle only by the flow capacity of the spray nozzles. As a consequence of this, CT refrigerated goods vehicles, which are used in foodstuffs distribution traffic and naturally have numerous door openings during refrigerated operation, exhibit considerable advantages in respect of the quality of the refrigeration. In particular in the height of the summer, when mechanical refrigeration plants have to struggle with reduced performance of their condensers and with icing-up of their evaporators, the CT method demonstrates its advantages in terms of efficiency, dependability and performance. After opening a door, it takes only seconds for the reference temperature to be achieved once again.

The method also has its disadvantages, however. The consumption of nitrogen is relatively high, because at least some of the gas sprayed into a chamber also escapes again as exhaust gas. If, for example, a frozen food chamber is refrigerated, the temperature of the exhaust gas will be in the order of −30 to −40° C. The fact that a load space requires to be fully ventilated for reasons of safety before being entered is also disadvantageous. An unnecessarily large quantity of warm air enters the load space in this case. Although the renewed reduction in temperature admittedly takes place very rapidly, it consumes more energy and as a result incurs more costs than necessary. The otherwise customary installation of cold retention systems, such as a curtain, is inappropriate in the case of CT refrigerated vehicles, because they would impair the ventilation in a dangerous manner.

EP 0 826 937 describes a refrigeration unit for a chamber to be refrigerated.

EP 1 593 918 relates to an indirect means of refrigeration for refrigerated vehicles, in which a heat exchanger is arranged for the evaporation of low-temperature liquefied gas in a refrigerated chamber.

Liquefied low-temperature nitrogen has a temperature of 77° K under normal pressure. The cold that is stored in this case is present as two components: on the one hand as a component that is liberated during the phase transition from liquid to gaseous at a temperature of 77° K, and on the other hand as a component that absorbs heat in conjunction with heating of the gaseous phase from 77° K up to the exhaust gas temperature. The two components, enthalpy of evaporation and specific heat, are of approximately the same size as a rule.

Previously disclosed is the supply with the help of a motorized pump of the liquefied gas stored in a tank and carried on the vehicle from the tank into an evaporator of a heat exchanger, in order to deliver the stored cold to a refrigerated chamber of the refrigerated vehicle.

Also previously disclosed is the utilization of the vapor pressure created above the liquid phase in the tank for the supply of the liquefied gas into an evaporator arranged above the tank.

A substantial positive pressure must be present inside the tank, however, in order to ensure a reliable mode of operation of the cooling system, for which purpose the temperature inside the tank must be noticeably higher than the boiling temperature of the liquefied gas at ambient pressure. Raising the temperature means that a component of the cold that is stored in the liquefied gas is not utilized. Moreover, cooling shortly after charging the tank with fresh liquefied gas is not yet possible as a rule, because the temperature of the gas at the time of its supply is too cold to be able to assure the generation of pressure inside the tank. The use of heating elements inside the tank is admittedly possible, although this is not optimal in a thermodynamic sense. The use of a motorized pump is admittedly justifiable in a thermodynamic sense, although it is comparatively exposed to interference and comparatively maintenance-intensive.

SUMMARY OF THE INVENTION

The object of the present invention is to propose a method and a device for the generation of a positive pressure inside a tank for liquefied gas on a refrigerated vehicle, a cooling system for a refrigerated vehicle and a refrigerated vehicle, by means of which reliable, safe and efficient operation of the refrigerated vehicle is possible.

This object is achieved, as indicated in the independent claims. Additional advantageous embodiments, further developments and advantageous aspects, which in each case can be utilized individually or combined with one another as required in an appropriate manner, are indicated in the following description and in the dependent claims.

The method according to the invention for generating a positive pressure in a tank for liquefied gas on a refrigerated vehicle with an evaporator for the liquefied gas, in conjunction with which the evaporator is connected in a fluid-conducting fashion to the tank via a line for liquefied gas, and in conjunction with which a valve is arranged in the line, comprising the following method steps: opening the valve and permitting liquefied gas to exit from the tank and into the line; closing the valve in such a way that a quantity of the liquefied gas remains in the line and is able to flow back into the tank; heating the quantity in the line.

The refrigerated vehicle exhibits at least one refrigerated chamber for receiving products to be refrigerated. The vehicle can exhibit, in particular, a first refrigerated chamber for deep-frozen products, for example for temperatures between −25° C. and −18° C., and at least one refrigerated chamber for fresh products, in particular for temperatures between +4° C. and +8° C. A refrigerated chamber can be accessible on foot and/or can exhibit an internal volume of at least 2 m$^3$. Liquid nitrogen or liquid carbon dioxide, for example, can be used as a liquefied gas. The tank is in particular thermally insulated, for example with vacuum insulation (super insulation) or a foam jacket.

The part of the line between the tank and the evaporator, which is situated upstream of the valve, is used for heating and evaporating a quantity of the liquefied gas. In this way, additional energy-consuming internal heating of the tank is no longer required. The line as such is used as a local heating element. To enable the line to heat the liquid gas, the valve in the line is not arranged directly on the tank, but further downstream. The line exhibits in particular a line discharge orifice on the tank, and the valve is arranged downstream of this line discharge orifice. In the section of the line between the line discharge orifice and the valve, liquefied gas from the tank is able to exit from the tank by the customary vapor pressure of the gas inside the tank, for which reason high positive pressure is not required in the tank. By closing the valve, the quantity of the liquefied gas present in this section is enclosed inside the line. The quantity of the liquefied gas present in the line is able to flow back into the tank, and a pressure arising as a result of evaporation in the line can extend as far as the tank. Heating of the liquefied gas and the associated evaporation cause the liquefied gas to expand as a result of the transition between the liquid and the gaseous phase, as a consequence of which a positive pressure is established inside the tank. The positive pressure generated in the tank can then be used for the purpose of forcing liquefied gas from the tank into the evaporator.

The period for which the quantity of the liquefied gas in the line upstream of the valve remains present, or the period for which it is heated, is in particular at least 10 seconds, in particular at least 30 seconds, and for example at least 100 seconds. The opening duration of the valve can be between one second and 100 seconds, for example between 2 and 20 seconds. No stationary condition occurs in the line between the line discharge orifice on the tank and the valve due to the pulsed operation of the valve, and the temperature fluctuates according to the closing condition of the valve and the removal of liquefied gas from the tank. The process of opening and closing the valve is used to generate the pressure inside the tank. In conjunction with this, opening the valve allows liquid gas to pass into the line, and closing the valve and heating the line causes the liquid gas to evaporate. In this way, pressure is generated in the line and thus also in the tank.

The evaporator can be configured as a heat exchanger, with which the cold contained in the liquefied gas is given off indirectly to a refrigerated chamber of the refrigerated vehicle.

At the time of closing the valve in the line upstream of the valve, a volume of liquefied gas of at least $1/1500$, in particular at least $1/700$ and, for example, at least $1/300$ of the volume of the tank is advantageously enclosed. Dimensioning of this kind ensures that the generation of an adequate pressure in the tank is brought about by the evaporation of the liquid gas present in the line.

It is possible to repeat opening and closing of the valve several times, in order to bring the pressure in the tank to the desired level. Multiple repetition of the process stages enables the generation in the tank higher pressures than would be possible with a single opening and closing cycle of the valve.

At least 10%, in particular at least 20% and, for example, at least 50% or at least 80% of the quantity of the liquefied gas remaining in the line is caused to evaporate by the heating process. Advantageously, the quantity remaining in the line is evaporated completely.

The heating can take place by means of environmental heat on the line. The environmental heat heats up the line and with it the liquid gas. The thermal insulation on the line can be selected in such way for this purpose that an adequate thermal input is always assured. For example, the line between the tank and the evaporator is thermally insulated, for example with vacuum insulation or a foam jacket, and is provided at one point with a thermal bridge, with which heat is able to find its way from the outside to the liquefied gas. The thermal bridge is provided on the line in particular in areas or in sections. It is advantageous if the thermal input, in particular the heat transfer coefficient, can be adjusted and/or varied on the line, for example on the thermal bridge. The adjustability of the thermal input offers the possibility of particularly accurate control when generating the positive pressure.

Because there is no need to produce the heat actively, rather it is applied from the environment, the method requires less energy than previously disclosed methods. The method operates particularly reliably, given that no complex components, such as electric motorized pumps, are required.

The method according to the invention for the supply of liquefied gas from a tank into an evaporator of a refrigerated vehicle situated at a geodetically higher elevation, in conjunction with which the evaporator is connected to the tank via a line for liquefied gas in such a way as to permit a flow and a valve is arranged in the line, comprises the steps: generating a positive pressure in the tank by the method according to the invention and opening the valve and allowing the liquefied gas to be forced by the positive pressure into the evaporator. Advantageously, the valve is opened in a pulsing fashion. The pulses exhibit a duration of 0.5 second to 100 seconds, for example, and in particular from 1 second to 5 seconds. Particularly reliable and energy-efficient operation of the refrigerated vehicle is possible in this way.

The device according to the invention for generating a positive pressure in the tank for liquefied gas on a refrigerated vehicle with an evaporator for the liquefied gas, in conjunction with which the evaporator is connected in a fluid-conducting fashion to the tank via a line for liquefied gas, and in conjunction with which a valve is arranged in the line, comprises a control means for the implementation of the method according to the invention for generating a positive pressure inside a tank for liquefied gas.

Because of the structure of the pressure generation, the device can be of a robust design so that reliable operation is assured. The device makes a particularly economical means of generating the positive pressure in the tank possible.

The internal volume in the line upstream of the valve is in particular at least $1/1500$, in particular at least $1/700$, and for example at least $1/300$ of the internal volume of the tank.

The expression upstream means in the direction from the valve to the tank. The direction of flow of the liquefied gas is determined by the direction in which the liquefied gas flows during cooling, namely from the tank towards the evaporator and the heat exchanger.

The line exhibits in particular thermal insulation. The line can exhibit a thermal bridge upstream of the valve. The thermal bridge can advantageously be of a variable design, so that a heat transfer coefficient and/or a cold transfer efficiency can be stipulated and adjusted.

The cooling system according to the invention for a refrigerated vehicle having at least one refrigerated chamber, a tank for liquefied gas and an evaporator for the evaporation of the liquefied gas and the delivery of cold to the refrigerated chamber, in conjunction with which the evaporator is connected in a fluid-conducting fashion to the tank via a line for liquefied gas, and in conjunction with which a valve is arranged in the line, exhibits the device according to the invention for generating a positive pressure. The cooling system is characterized by its high efficiency and its high operating reliability.

The refrigerated vehicle according to the invention exhibits the cooling system according to the invention.

BRIEF DESCRIPTION OF THE FIGURES

Further advantageous aspects and further developments, which can be utilized individually or can be combined with one another in a suitable manner, as required, are explained on the basis of the following drawing, which is intended not to restrict the invention, but only to illustrate it by way of example.

DETAILED DESCRIPTION OF THE INVENTION

Figure 1:
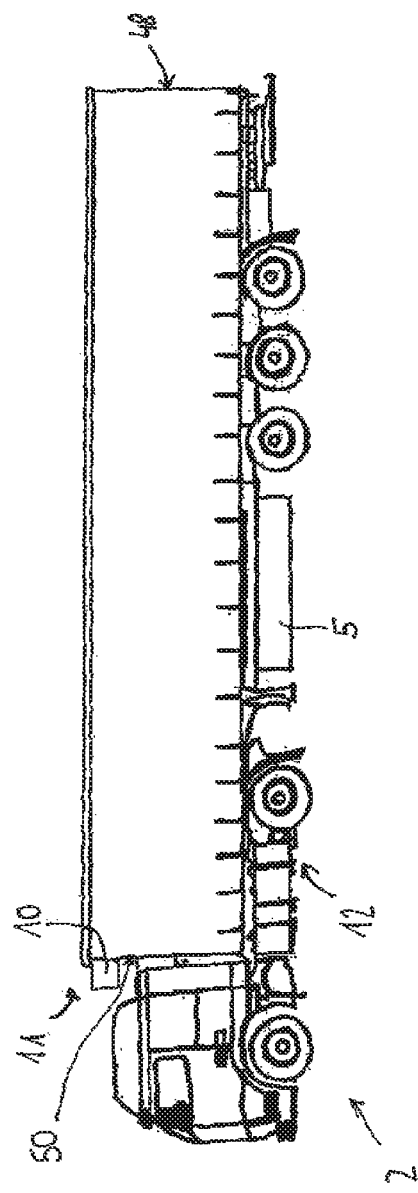
FIG. 1 is a side view schematic of a refrigerated vehicle according to the invention.

FIG. 1 depicts a refrigerated vehicle 2 according to the invention as a side view with a refrigeration module 10, which is installed in an upper area on a face 50 of the refrigerated vehicle 2. The refrigeration module 10 comprises an evaporator 1 and heat exchanger 30 (see FIG. 2), which is supplied with liquefied gas from a thermally insulated tank 5. The tank 5 exhibits a jacket for thermal insulation, preferably a vacuum jacket or even a foam jacket, and is connected in a fluid-conducting manner to the refrigeration module 10. The tank is mounted in a lower area 12 of the refrigerated vehicle 2.

Figure 2:
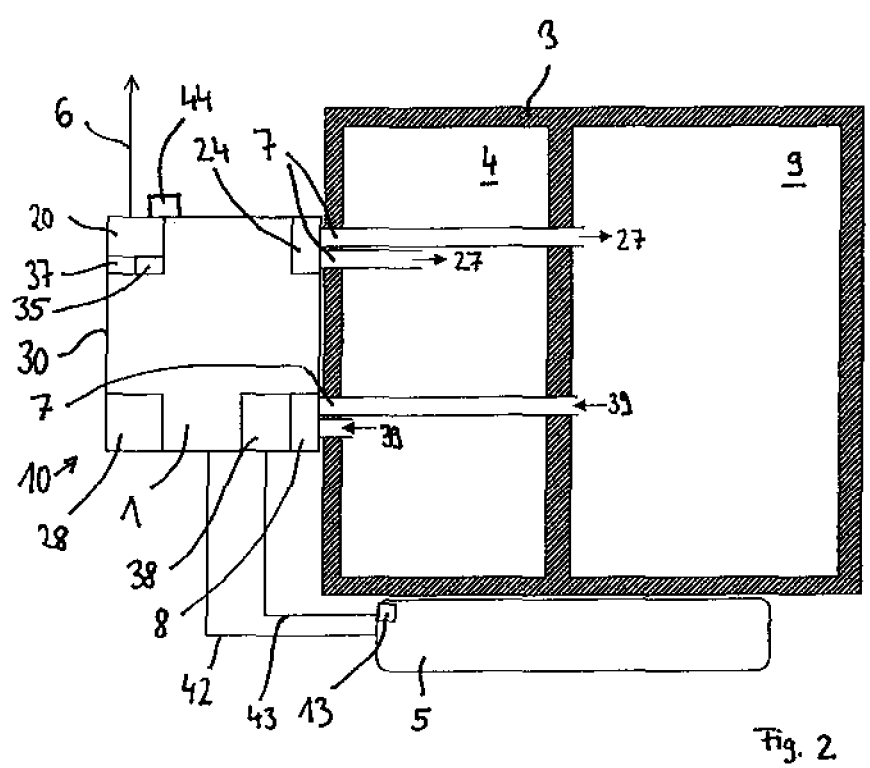
FIG. 2 is a sectional view schematic of an evaporator of a refrigerated vehicle according to the invention.

FIG. 2 depicts an evaporator 1 arranged outside a refrigerated chamber 4, 9, which evaporator constitutes part of a heat exchanger 30, in order to liberate the cold arising from the evaporation of liquefied gas to a cooling air for cooling 39 taken in from the refrigerated chambers 4, 9. The goods (not shown here) stored in the refrigerated chambers 4, 9 are cooled with the refrigerated cooling air 27. The evaporator 1 is connected in a fluid-conducting manner to the tank 5 by a line 42 for liquefied gas. The exhaust gas that is evaporated and heated in the evaporator 1 is released into the environment via an exhaust pipe 6. The tank 5 is arranged beneath the evaporator 1. The tank 5 stores liquefied nitrogen at a temperature of around 80 kelvin at a slight positive pressure. The positive pressure inside the tank 5 is used to bring liquefied gas from the tank 5 into the evaporator 1. In the event of the removal of large quantities of gas from the tank 5, and in order to cause pressure to build up inside the tank 5 after filling the tank 5 with liquefied gas, a pressure build-up means 13, preferably a tank heating arrangement, is provided inside the tank, by means of which the liquefied gas can be locally heated and evaporated. The control valve for the pressure build-up means 13 is connected in an electrically conducting manner via a line 43 to a pressure controller 38 on the refrigeration module 10. The pressure inside the tank 5 is regulated with the help of the pressure controller 38. The refrigerated chamber 4 is configured for frozen products and exhibits a temperature between −25 and −18° C. It is also possible, for example, for significantly lower temperatures (−60° C.) to be present. The refrigerated chamber 9 is configured for fresh products and exhibits a temperature between +4 and +12° C. The cooling air is conveyed by means of a ventilator 8 between the refrigerated chambers 4, 9 and the heat exchanger 30 arranged outside the refrigerated chambers 4, 9, for which purpose the refrigerated chambers 4, 9 are connected to the heat exchanger 30 in a fluid-conducting manner via flow channels 7. The refrigerated chambers 4, 9 are surrounded by a refrigerated chamber housing 3. The refrigerated chamber housing 3 provides thermal insulation. The refrigeration module 10 is arranged outside the refrigerated chamber housing 3, which in this case is rectangular in form. The refrigeration module 10 is also thermally insulated.

The refrigeration module 10 exhibits a phase separator 24, through which a quantity of the liquefied gas that has not been evaporated in the evaporator 1 can be separated from the evaporated gas quantity. The separated and non-evaporated liquid quantity is then returned to the evaporator 1. The heat exchanger 30, or the evaporator 1, exhibits a resistance heating means 28, with which any ice formed on the evaporator 1 or inside the heat exchanger 30 can be defrosted. Defrosting of the ice can also be effected, alternatively or in addition to operating the resistance heating 28, by recirculating the air from the refrigerated chamber 4. In this case, the air is cooled with the specific heat from the ice and the heat exchanger 30 and the enthalpy of melting. Recirculation does not, therefore, result in a thermal input into the refrigerated chambers 4, 9. This is also true of a refrigerated chamber that is operated at a temperature below zero degrees Celsius, if the air comes from a refrigerated chamber that is operated at a temperature above the freezing point of water and is returned to it. This is possible because the flow channels 7 can be closed during defrosting, so that the refrigerated chamber 4, 9 and the associated heat exchanger 30 are thermally disconnected. Particularly energy-efficient de-icing of the evaporator 1 or the heat exchanger 30 is enabled in this way. The refrigeration module 10, or to be precise the evaporator 1 or the heat exchanger 30, additionally exhibits a means 20 for testing the gas tightness of the cooling system and in particular of the heat exchanger 30 and the evaporator 1. Provided for this purpose at various points in the evaporator or in the heat exchanger 30 are pressure sensors 35 and temperature sensors 37, with which the chronological time sequence of the pressure and the temperature in the heat exchanger 30 and the evaporator 1 is determined. It is possible in this way to establish in particular whether a positive pressure remains stable in a closed section of the line in the evaporator 1 or the heat exchanger 30, or whether it falls over time due to leakage. With the help of the temperature sensors, it is possible to establish whether a liquid phase is present in the heat exchanger 30 or in the evaporator 1. Testing of the gas tightness can be carried out at night, for example, when the refrigerated vehicle 2 is stationary. This allows high accuracy of the measurement concerned to be achieved advantageously.

Figure 3:
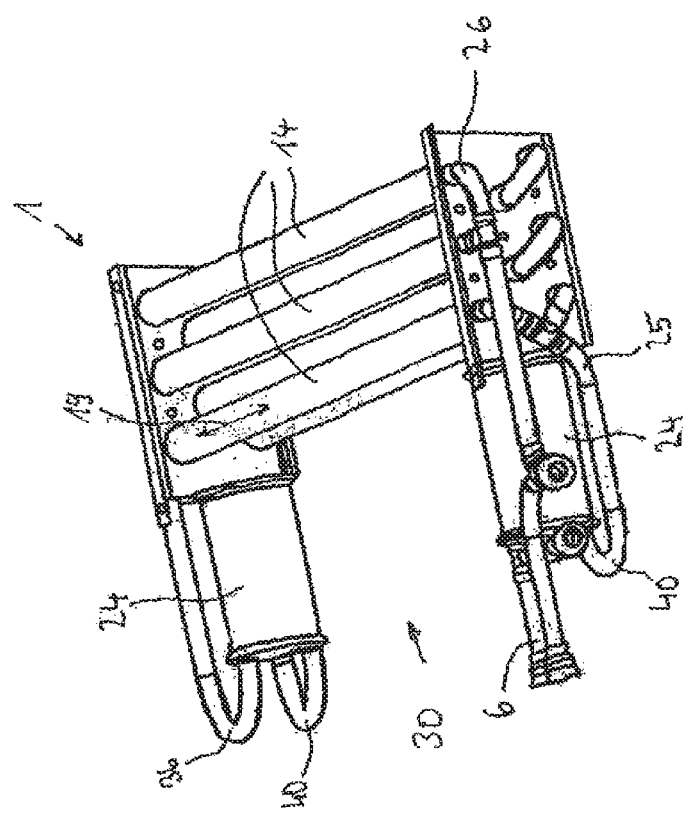
FIG. 3 is a perspective view schematic of an evaporator for the refrigerated vehicle according to FIG. 1.

FIG. 3 depicts the evaporator 1 as a perspective view at an oblique angle with pipes 14, in which the liquefied gas is evaporated, and over the external surface of which the cooling air for cooling 39 flows. The pipes 14 exhibit a longitudinal axis 19, at least in segments. Provided on the evaporator 1 are phase separators 24, through which a non-evaporated quantity of the liquefied gas flowing through the pipes 14 can be separated from the evaporated gas and returned to the pipes 14. An inlet side 26 for the pipes 14 is arranged geodetically lower than an outlet side 25 for the pipes 14. A return line 40 for the phase separator 24 is arranged beneath a supply line 36 for the phase separator 24. A catch tank 31 (see FIG. 10) to catch meltwater during a de-icing sequence is provided below the evaporator 1. The pipes 14 can be folded, helically coiled and wound in meandering form in order to ensure a particularly compact design of the heat exchanger 30 or the evaporator 1.

Figure 4:
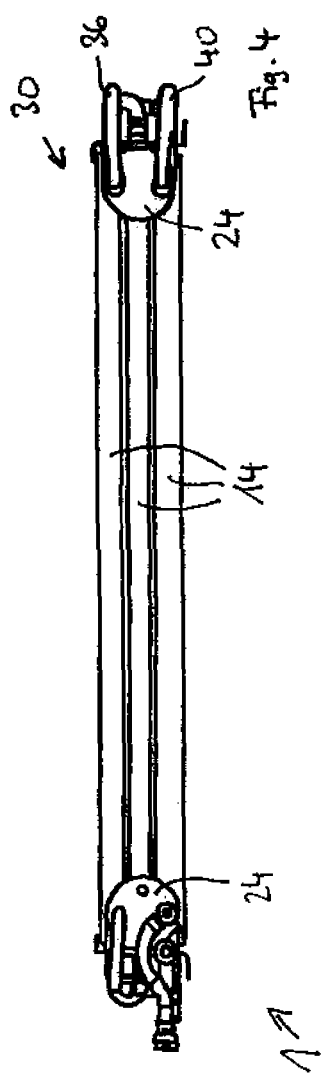
FIG. 4 is a side view schematic of the evaporator according to FIG. 3.
Figure 5:
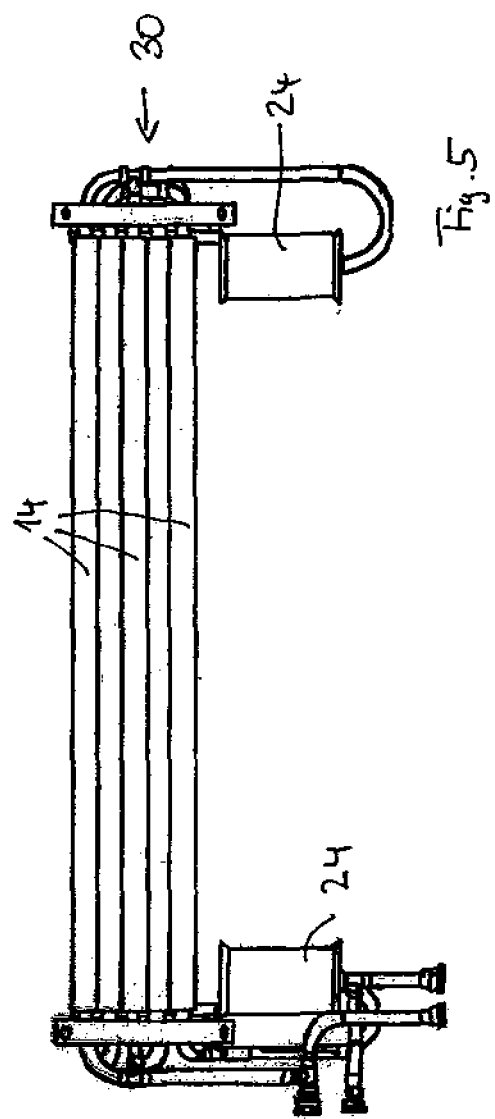
FIG. 5 is a top view schematic of the evaporator according to FIGS. 3 and 4.

FIG. 4 depicts the heat exchanger 30 according to FIG. 3 as a side view. FIG. 5 depicts the heat exchanger 30 as a top view.

Figure 6:
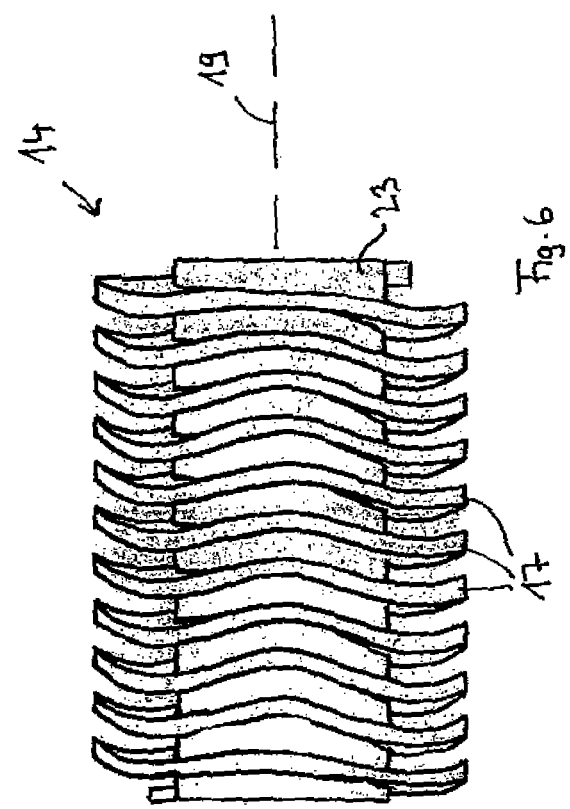
FIG. 6 is a top view schematic of a pipe of the evaporator according to FIG. 3.

FIG. 6 depicts a detailed view of the pipe 14 as a top view. The pipe 14 extends along the longitudinal axis 19. The pipe 14 exhibits fins 17 at its periphery, which are pressed directly from the pipe body by a special process—that is to say, they actually represent a workpiece with the pipe 14. The fins 17 can be welded to a pipe wall 23 of the pipe 14. The pipe 14 and the fins 17 are made in particular of copper. A particularly efficient transfer of heat from the cold arising in conjunction with the evaporation and heating of the liquefied gas to the cooling air for cooling 39 is achieved with the help of the fins 17. The fins 17 are undulating in order to increase the surface area per unit of volume, and in order to generate turbulences in the cooling air for cooling 39, as a result of which the liberation of cold and the transfer of cold are increased.

Figure 7:
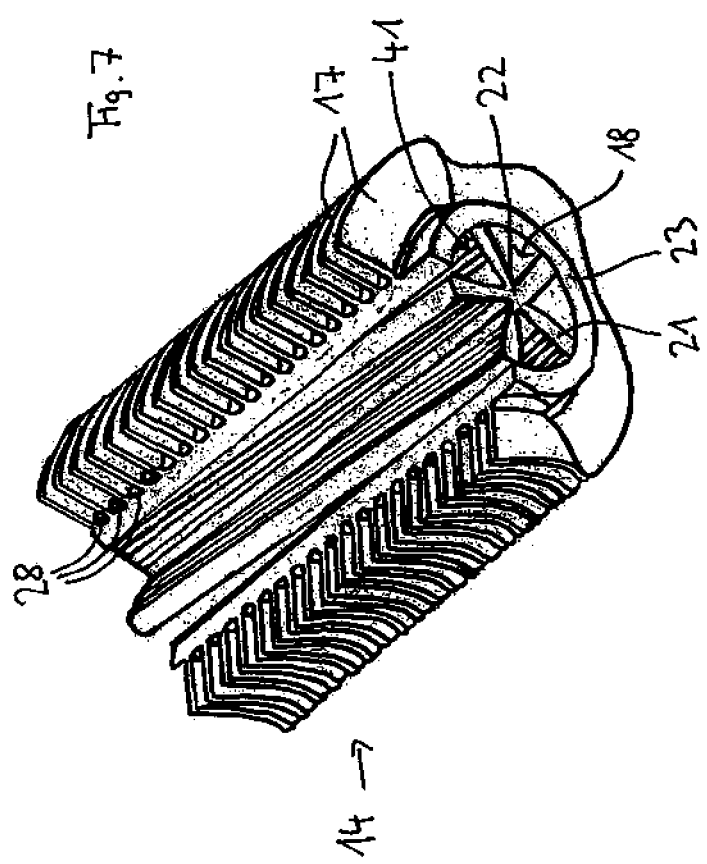
FIG. 7 is a sectional perspective view schematic of the pipe according to FIG. 6.

FIG. 7 depicts a sectioned view of the pipe 14 according to FIG. 6 as a three-dimensional perspective view. The pipe 14 exhibits a pipe wall 23, around which the undulating fins 17 are arranged, and to which the fins 17 are attached. The fins 17 can be soldered to the pipe wall 23. In order to simplify de-icing of the fins 17, a resistance heating means 28 is provided between the fins 17. The resistance heating means 28 is constituted by a plurality of electrically insulated wires, which are heated by the effect of an electric current. Elements 18 for the generation of flow turbulences or for the radial separation of liquefied and evaporated gas are introduced into the interior of the pipe 14. The elements 18 are envisaged as baffles 21 and can be inserted into the pipe 14 as a star-shaped profile rod 22. The baffles can be soldered or welded in particular to the pipe wall 23. The profile rods 22 in the pipes 14 are transposed in the longitudinal axis 19. The thickness of a vapor layer formed between the pipe wall 23 and a drop of liquid of the liquefied gas is reduced in this way. The transposition causes the liquefied gas to be forced against the inside of the wall 23 of the pipe as it flows through the pipe 14. The elements 18 also exhibit swirl structures 41, which help to impart swirling to the liquefied gas in the pipe 14. The swirling phenomena in the pipe 14 lead to a reduction in the thickness of the vapor layer between the liquefied gas and the wall 23 of the pipe, as a result of which the efficiency of the transfer of cold from the liquefied and warming gas to the air for cooling 39 is increased. The baffles can be made of a material other than the wall 23 of the pipe, for example the baffles can be made of plastic. It is advantageous if the baffles 21 are produced from a material with high thermal conductivity and are connected to the wall 23 of the pipe in such a way as to ensure high thermal conductivity. Heat transfer resistance between the baffles 21 and the wall 23 of the pipe can be reduced, for example, by soldering or welding. The lowest possible resistance to thermal transfer is advantageous with a view to ensuring the most efficient possible transfer of the cold contained in the liquefied gas to the fins 17.

Figure 8:
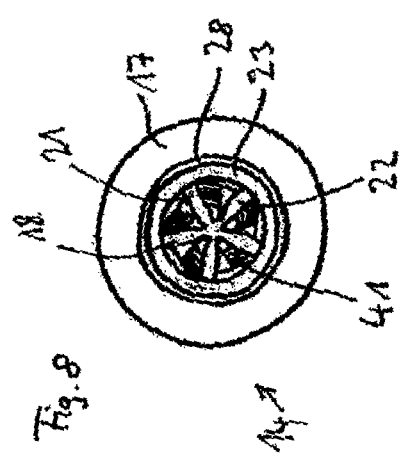
FIG. 8 is a cross sectional view schematic of the pipe according to FIGS. 6 and 7.

FIG. 8 depicts a cross section through the pipe 14 according to FIGS. 6 and 7 as a sectioned view perpendicular to the longitudinal axis 19. The elements 18 are present as transposed, star-shaped baffles 21, which are inserted in the form of profile rods 22 into the interior of the pipe 14. The cross sections of the profile rods 22 are executed as a star with five radial arms, which are soldered to the wall 23 of the pipe. The individual radial arms exhibit swirl structures 41, which are formed by undulations or surface roughness on the profile rods. The turbulence inside the pipe 14 is increased both by the baffles as such, and by the swirl structures 41 on the baffles 21, as a result of which an improved transfer of cold from the liquefied gas to the fins 17, and thus to the cooling air for cooling 39, is achieved.

Figure 9:
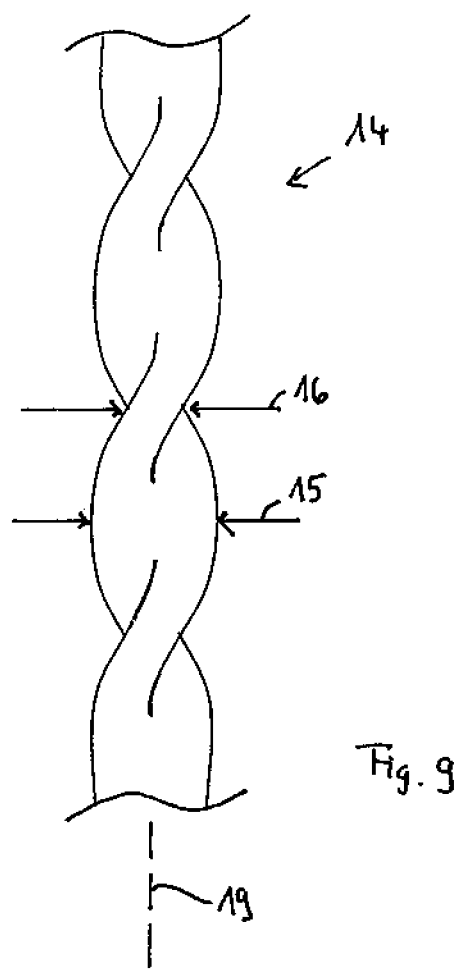
FIG. 9 is a side view schematic of an additional pipe for an evaporator of a refrigerated vehicle according to the invention.

FIG. 9 depicts a further embodiment of a pipe 14, in which no fins 17 are shown in the interest of greater clarity. This embodiment is concerned with a transposed flat pipe, where the pipe 14 exhibits an internal pipe cross section which varies along the length of the pipe 14. The internal cross-sectional surface of the pipe 14 is preferably round, elliptical or strongly elliptical and is twisted along the length of the pipe 14. In particular, the surface of the projection of a first internal cross section of the pipe at a first pipe location 15 onto a second internal cross section of the pipe at a second pipe location 16 is less than 30% of the surface of the internal cross section of the pipe. The two pipe locations 15, 16 are displaced by 100 mm along the longitudinal axis 19 in this case. A centrifugal separation of the liquid (external) and the gas (internal) is produced by the twisting of the flat pipe in conjunction with the flow through the pipe 14, which intensifies the thermal contact between the liquefied gas and the wall 23 of the pipe.

Whereas baffles 21 are provided in the interior of pipes 14 in order to generate turbulences in the pipe 14 in the embodiment according to FIG. 7, the pipe as such is profiled in the embodiment according to FIG. 9, in particular being transposed or undulating, in order to generate a turbulence in conjunction with the flow.

Figure 10:
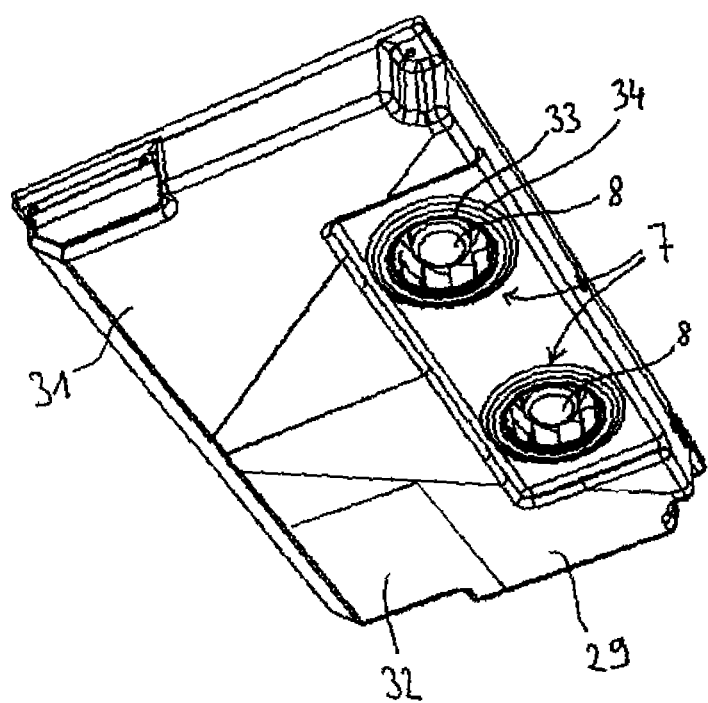
FIG. 10 is a perspective oblique view schematic of a housing for a heat exchanger.

FIG. 10 depicts a heat exchanger housing 29 for the heat exchanger 30, which is conceived as a catch tank 31 for installation internally in the heat exchanger 30, in order to catch the dripping meltwater in conjunction with de-icing and to lead it away via a drain channel (not shown). The catch tank 31 can exhibit additional heating elements 32, with which ice can be defrosted. The heat exchanger housing 29 exhibits flow channels 7 for the cooling air for cooling 39 or the refrigerated cooling air 27. The heat exchanger housing 29 in this case exhibits discharge openings 33, which include edges 34, by means of which the liquid water produced during defrosting can be arrested, so that it is not blown into the refrigerated chamber 4, 9 by the fan. Icing-up of the flow channels 7 by meltwater is prevented particularly effectively by this means. The arresting edges can be in the form of skirts, labyrinth structures or deflector plates, for example.

Figure 11:
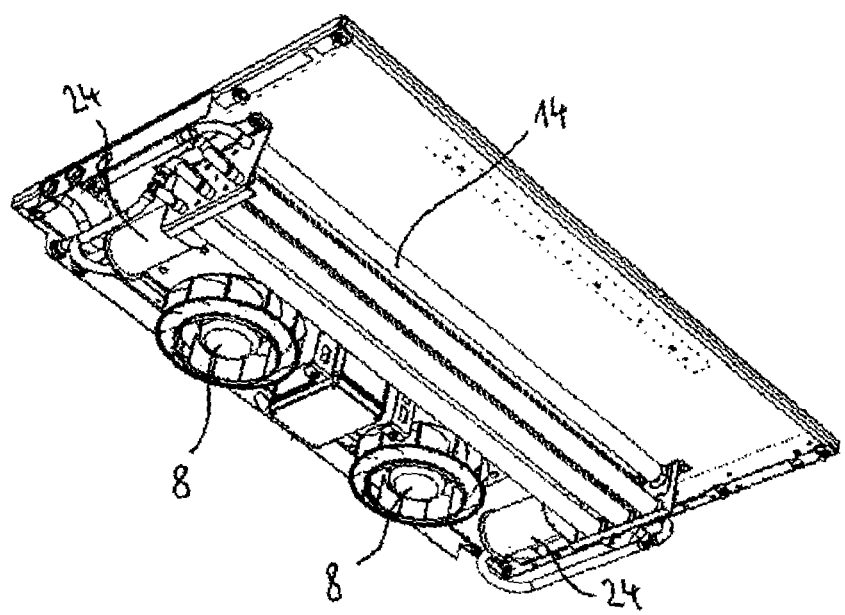
FIG. 11 is a perspective three-dimensional oblique view schematic of a refrigeration module of the kind that can be used, for example, in a refrigerated vehicle according to FIG. 1.

FIG. 11 depicts the refrigeration module 10 of the kind that can be used, for example, in a refrigerated vehicle according to FIG. 1 as a perspective three-dimensional oblique view in the opened form. A particularly compact design is achieved through the modular arrangement of the ventilators 8, the phase separators 24 and the pipes 14.

Figure 12:
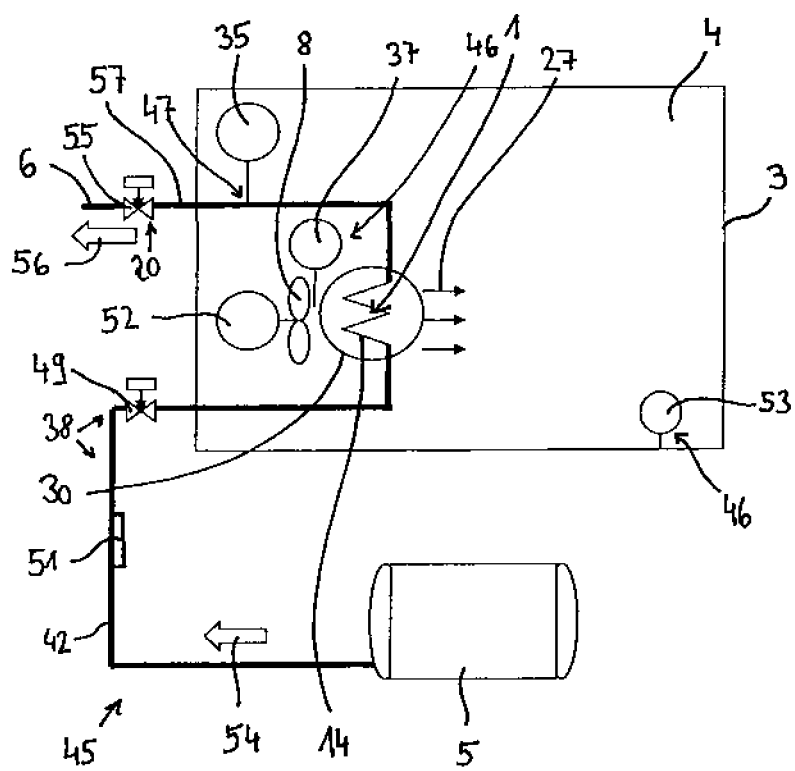
FIG. 12 is a schematic of a pressure generation system or a leakage testing system according to the invention.

FIG. 12 depicts schematically a cooling system according to the invention with a pressure control means 38 for the purpose of conveying liquefied gas from the tank 5 into the evaporator 1 without resorting to the use of a motorized pump. The cooling system exhibits a means 20 for testing the gas tightness of the cooling system 45, the heat exchanger 30 or the evaporator 1. The evaporator 1 is connected to the tank 5 in such a way as to permit a flow via the line 42 for liquefied gas. Liquefied gas is forced into the line 42 in a direction of flow 54 of the liquefied gas by a pressure arising in the tank 5. In order to increase the pressure in the tank 5, the line 42 is closed by means of a valve 49, in conjunction with which a quantity of liquefied gas in the line 42 is caused to evaporate upstream of the valve 49, that is to say between the valve 49 and the tank 5, by warming of the line 42. The valve 49 is also designated as an inlet valve. The line 42 can exhibit thermal insulation, such as dual-wall vacuum insulation (super-insulation) or a foam jacket. As a general rule, the thermal input is great enough, in spite of this thermal insulation, to evaporate a sufficiently large quantity of liquefied gas in the line 42 upstream of the valve 49, and to increase the pressure in the tank 5. In specific cases, it may be appropriate to provide a thermal bridge 51 in the line 42 upstream of the valve 49, which bridge takes care of the necessary thermal input. The thermal bridge 51 can be formed by a reduction in the insulation on the line 42, in conjunction with which the thermal bridge is provided in particular on a section of the line 42 and is advantageously arranged in a variable manner in respect of a heat transfer coefficient. The valve 49 is opened in pulses, causing liquefied gas to be forced in the direction of flow 44 into the line 42 and conveyed into the heat exchanger 30. No stationary condition occurs due to the pulsed operation of the valve 49 in the line 42, so that the temperature in the line 42 upstream of the valve 49 fluctuates laterally according to the closing condition of the valve 49 and the removal of gas from the tank 5.

In order to ensure an adequate build-up of pressure in the tank 5, the internal volume of the line 42 upstream of the valve 49 as far as the opening on the tank 5 is at least approximately 1/1000 of the internal volume of the tank 5. The heat exchanger is arranged inside a refrigerated chamber housing 3 and liberates refrigerated cooling air 27 to the refrigerated chamber 4. For this purpose, the air inside the refrigerated chamber 4 is recirculated with the help of a ventilator 8, which is driven by a motor 52. Inside the refrigerated chamber 4, an initial temperature sensor 37 is provided in a first point 46, in order to determine temperature fluctuations. If the temperature inside the refrigerated chamber 4 falls abruptly at a rate of more than 5° C. per minute, an initial warning signal is given, which draws the attention of the operator of the refrigerated vehicle 2 to the possible presence of a leak in the cooling system 45. An additional temperature sensor 53, which serves the same purpose, can be provided inside the refrigerated chamber 4 in an additional first point 46.

The motor 52 can be operated as an electric motor or pneumatically utilizing the evaporated gas. The liquefied gas is conveyed downstream of the valve 49 through the evaporator 1 and the heat exchanger 30 as far as an additional valve 55. The evaporated gas is then released into the environment as exhaust gas 56 via the exhaust pipe 6. The line section 57 of the line 52 between the valve 49 and the additional valve 55 can be closed off with the help of the two valves 55, 49. It is possible in this case in particular to enclose a positive pressure if the line section 57 is gastight. Provided on the line section 57 in a second point 47 is a pressure sensor 35, which registers the chronological time sequence of the pressure in the line section 57. If a positive pressure enclosed between the valves 55, 49 falls below a set value, or if the positive pressure varies more rapidly than a set reference value, for example more rapidly than 0.2 bar per minute, a second warning signal will be given. The first warning signal and the second warning signal are indicated to the driver of the refrigerated vehicle 2 on an indicator instrument 44 (see FIG. 2). The valve 49, the additional valve 55, the pressure sensor 35 and the temperature sensors 37 and 53 constitute the means 20 for testing the gas tightness of the heat exchanger 30, the evaporator 1 and the cooling system 45. The additional valve 55 is also designated as an exhaust gas valve.

Use is made advantageously of at least two heat exchangers 30 and at least two evaporators 1, which defrost and cool alternately. Greater operating reliability is achieved in this way. Energy costs, which arise as a result of an active defrosting process in the event of ice formation on the heat exchanger 30 and on the evaporator 1, are also reduced significantly by this means.

A homogeneous material pairing should be used for the choice of material of the heat exchanger. Heat exchangers made of aluminum or copper have proven themselves in service in low-temperature engineering. For production engineering reasons, a homogeneous choice of materials consisting of copper pipes and copper fins is preferably selected, although other suitable materials can find an application. Heat exchanger pipes are used in this application preferably as ribbed pipes, which consist homogeneously of copper and possess copper fins on the outer envelope surface. These can be soldered, welded, clamped or attached to or installed on the outer envelope surface by other methods. The fins 17 are preferably pressed from the pipe material by rolling processes and are then provided with an undulation on the lateral surface. This fin undulation is produced in the final rolling operation. In the event of a transverse laminar flow through the pipe, the undulating form produces a turbulent airflow between the fins 17, which manifests itself positively on the air side as higher heat transfer coefficients. The rolled fins 17 preferably run along the periphery in the form of a screw with a distance between the fins of between 2 and 10 mm, and preferably 3 mm. Other distances between the fins can be used, however. The pipes 14 provided with fins 17 are preferably held in end fins. The expression end fin is understood to denote a plate provided with holes, through which the pipe connections of the pipes are passed. Around the holes, slots are drawn through the end fins in such a way that the pipes are able to move individually in each case in relation to the attachment points of the end fin. The pipe ends preferably project beyond the end fins. The end fins, which preferably consist of copper, and the pipe connections of the ribbed pipes are securely attached to the end fins, preferably by soldering. The pipe ends of the pipes 14 provided with fins projecting from the end fins are connected to one another with copper pipes or bridges.

In the initial phase of the transmission of heat from the liquid nitrogen to the pipes, a phase transition from the liquid to the gaseous physical condition takes place in the heat exchanger pipes. During this change in physical condition, a liquid-vapor mixture reaction takes place through film and nucleate boiling. Experience shows that high accelerations of the liquid due to vapor bubbles formed in the direction of flow ahead of the liquid occur as the result of nucleate boiling inside pipes.

In previously disclosed evaporators 1, the resulting small vapor bubbles are combined into large vapor bubbles in fractions of a second and propel the column of liquid in front of them through the heat exchanger pipe at an explosive rate as a result of the change in volume. In previously disclosed heat exchangers, only an inadequate transmission of heat from the liquefied gas to the wall 23 of the pipe takes place through this process.

In the heat exchanger 30, elements are installed inside the pipe 17, which permit the most uniform evaporation possible inside the heat exchanger pipes and increase the heat transfer coefficients in this way. In order to achieve this optimization, flow profiles or baffles 21 are inserted inside the pipes 14, which ensure that the liquid always flows on the internal surface of the pipe wall 23. Profile rods 22 are used, for example, which divide the pipe cross section longitudinally into n sections. These sections are executed as circle segment profiles, in which the angle of the circle segment begins at the centre of the pipe and extends to the envelope surface. It is also possible to use other geometries, although these should only form the largest possible spatial volume on the inside of the pipe envelope. Preferably five radial internal profiles in the form of an internally located star are used. This star is twisted about the longitudinal axis. As already mentioned, at the time of entering the heat exchanger pipe, the liquefied nitrogen experiences acceleration due to the vapor bubbles that are formed and the change in volume resulting therefrom. The twisting or transposition of the profile rod 22 with n radial arms about the longitudinal axis 19 causes flow channels to be produced in the pipe 14, which channels exhibit the form of a coil internally along the envelope surfaces of the wall 23 of the pipe. A transposition of the profile rod 22 with n radial arms can be undertaken as required about the longitudinal axis 19 in relation to a length of the pipe 14. However, channels must still be present in the pipe after the twisting. The internal part is twisted between two times and ten times, and preferably three times per meter about the longitudinal axis 19. Twisting of the profile rod 22 with n radial arms presses the fluid that is caused to accelerate by centrifugal forces against the internal envelope surface and conveys it along the pipe. As a result of the difference in temperature between the liquid and the internal envelope surface, the physical condition of the liquefied nitrogen is changed by nucleate boiling. The heat transfer coefficients are increased significantly in this way. The liquefied gas can be almost entirely evaporated after a comparatively short distance.

All the pipes 14 present in the heat exchanger can be charged with liquid nitrogen. Preferably two pipes 14 are charged with liquid nitrogen. The ribbed pipes of the heat exchanger that are charged with liquid nitrogen are preferably the uppermost pipes in the geodetic sense. The two highest pipes in the geodetic sense on the air outlet side are used for the purpose of charging with fluid. In this way, a counterflow between the air flow for cooling and the flow of nitrogen is superimposed on the transverse flow.

A phase separator 24 is preferably connected downstream of the ribbed pipes 14 charged with fluid with a twisted star situated internally. The phase separator 24 collects any drops of liquid that have not been evaporated, which have not come into contact or have made only inadequate contact with the internal envelope surface. The phase separators are preferably configured as a horizontal pressure vessel. An inlet pipe is preferably routed for a short distance beneath the geodetically upward-facing envelope surface through the end face. The outlet pipes are present on the opposite side of the inlet pipe, and an outlet pipe is preferably routed geodetically for a short distance above the otherwise subjacent envelope surface through the end face.

The task of the phase separator 24 is to collect the entrained liquid components and to convey them back to the heat exchanger through the subjacent outlet pipe of the following pipe (ribbed pipe) exhibiting fins. Any collected nitrogen that remains unevaporated is preferably conveyed back to the two ribbed pipes, which are present at the lowest point in the geodetic sense on the air outlet side.

The downstream ribbed pipes 14 with a twisted internally situated profile rod 22 serve as pre-heaters for the gaseous nitrogen. n pipes can be connected downstream, in order to heat the gaseous nitrogen up to the stipulated exhaust gas temperature. Preferably six pipes are used as pre-heaters, in which case the two return pipes from the phase separator are also counted as pre-heaters.

The heat exchanger can preferably also be operated only as a pre-heater. For this purpose, the gas temperature at the inlet should lie significantly below the air inside the chamber to be refrigerated.

A means of resistance heating is provided, since it is not possible, for process engineering reasons, for a heat input for defrosting to be taken from the interior of the pipe 14. This defrosting heating can disperse any icing-up. In particular the fluctuations in temperature from −196° C. to +100° C. arising in this case require the heating and the pipes to possess special characteristics. An electrical heating means is required for defrosting, preferably with at least 2 to 40, and for example 9, silvered copper strands, which in each case can exhibit a diameter of 0.1 mm to 0.5 mm, for example 0.25 mm. The copper strands are contained in a sheath made of polymer, such as polytetrafluoroethylene (PTFE), to provide electrical insulation. The silvered copper strands with a PTFE sheath are wound helically between the fins 17 as far as the base of the ribbed pipe, so that contact is established between the heating cable and the copper of the ribbed pipe between each fin 17 and the base of the fin. Uniform heat distribution for defrosting is possible in this way on the whole of the heat exchanger.

In order to achieve targeted routing of the airflow over the entire heat exchanger packet, a heat exchanger housing 29 is designed as a covering hood, which on the one hand functions as a catch tank 31 for condensate water, and on the other hand assures the routing of the airflow inside the heat exchanger 30. In addition, the heat exchanger housing 29 also determines the air extraction direction in a targeted fashion. The air extraction direction is set, as necessary, on the front or optionally to the left, to the right or simultaneously to the left and to the right, by the expedient of providing reference breaking points in the hood of the heat exchanger such that parts of the hood which point in the desired air extraction direction can be readily broken open. A heat exchanger housing made of plastic, for example a plastic of the polystyrene/polyethylene material pairing, is preferably selected because of the large differences in temperature. This material pairing is characterized by its small thermal deformation. Moreover, the material can be readily formed and offers the possibility of internal insulation in order to avoid condensate on the outside.

The heat exchanger and, to be precise, the evaporator is advantageously equipped with a device for optimizing the transmission of heat for the evaporation of liquefied gases, and in particular for low-temperature liquefied nitrogen, which serves as an air cooler, in conjunction with which the heat exchanger and in particular the evaporator consists of ribbed pipes with rolled, undulating fins running round in the form of a screw. In this case, the material pairing of the heat exchanger pipe and the fins in particular consists of a homogeneous metal. The homogeneous material can be copper. Inside the ribbed pipes in particular, a flow profile is used which divides the cross section of the pipe longitudinally into n sections, in conjunction with which these sections can be executed as circle segment profiles, and/or the angle of the circle segment profile begins at the centre of the pipe and can extend as far as the envelope surface. Other geometries can also find an application here, which advantageously constitute the largest spatial volume on the inside of the pipe envelope. It is advantageous to use internal profiles with multiple radial profiles, and in particular five radial profiles, in the form of an internally located star profile. There is a particular preference to transpose the profile situated inside the ribbed pipe about the longitudinal axis, as a result of which helical channels, which taper towards the centre of the pipe, are formed inside the pipe. The flow profile present inside the ribbed pipe can divide the cross section of the pipe at least once. Advantageously, the flow profile present inside the ribbed pipe, which divides the pipe cross section at least once, is twisted helically in such a way that at least two helical fluid channels are formed inside the pipe. The pipes that are charged with liquid nitrogen are advantageously the geodetically uppermost pipes on the air outlet side. The ribbed pipes are advantageously soldered in each case on a copper end fin on either side. A horizontal phase separator 24 can be formed and/or welded on the end fin in each case as a pressure container. The inlet pipe into the phase separator 24 can be introduced into the phase separator in the upper area of the end surface, at a short distance below the envelope surface of the pressure container. The outlet pipe can be routed from the phase separator in the lower area of the end surface, at a short distance above the envelope surface of the pressure container. The plastic part of the heat exchanger can be made from a thermoplastic plastic (preferably polyethylene, PE) in a compression mould or a drawing mould. A material pairing of polystyrene/polyethylene is advantageous in view of the high temperature differences and the need for insulation.

Various additional aspects that are closely associated with the invention are described below. The individual aspects can be applied individually in each case, that is to say independently of one another, or can be combined with one another as required. These aspects can also be combined with the previously described aspects.

A particularly advantageous mobile refrigerated vehicle 2 in terms of its operating reliability, dependability energy-efficiency comprises a refrigerated chamber housing 3 for at least one refrigerated chamber 4 contained therein, a tank 5 for liquefied gas, an evaporator 1 for evaporating the liquefied gas while liberating cold to the refrigerated chamber 4, and an exhaust pipe 6 for the evaporated gas, the evaporator 1 being arranged outside the refrigerated chamber 4. The liberation of the cold from the evaporator 1 takes place advantageously to refrigerated air, which is conveyed via flow channels 7 from the refrigerated chamber 4 to the evaporator 1, and from the evaporator 1 to the refrigerated chamber 4. Provided in particular for this purpose is a ventilator 8, which is arranged outside the refrigerated chamber 4, in conjunction with which the ventilator 8 and the evaporator 1 can be attached as a refrigeration module 10 on the refrigerated vehicle 2. The refrigerated vehicle 2 exhibits in particular at least one first refrigerated chamber 4 for temperatures below 0° C., and in particular below −10° C., and at least one second refrigerated chamber 9 for temperatures above 0° C., and in particular between +4 and +10° C. The evaporator 1 can be arranged in an upper area 11, in particular on the roof or on the face, of the refrigerated vehicle 2. The tank can 5 be arranged in a lower area 12 of the refrigerated vehicle 2, in particular underneath the refrigerated vehicle 2. Provided on the tank 5 is in particular a pressure control 38, in particular with a pressure build-up means 13, for example a resistance heating means, through which the liquefied gas is forced into the evaporator 1. A means 20 for testing the gas tightness of the cooling system, and in particular the evaporator 1, is advantageously provided. The necessary heating energy can be taken from the environment.

An advantageous method for refrigerating a refrigerated chamber 4 of a mobile refrigerated vehicle 2 comprises the following method steps: removal of a liquefied gas from a tank 5 and supply of the gas into an evaporator 1 arranged outside the refrigerated chamber 4; removal of a flow of cooling air for cooling from the refrigerated chamber 4; evaporation of the liquefied gas in the evaporator 1 and utilization of at least a part of the cold component for the refrigeration of the flow of cooling air; introduction of the refrigerated flow of cooling air into the refrigerated chamber 4.

With a view to achieving a high degree of cold utilization, a particularly advantageous heat exchanger 30 for a mobile refrigerated vehicle 2 having a tank 5 for liquefied gas comprises at least one pipe 14 for receiving a flow of a liquefied gas and for the evaporation of at least one quantity of the liquefied gas, in conjunction with which the pipe 14, at least in sections, exhibits a longitudinal axis 19, and the heat exchanger 30 comprises an inlet side 26 for liquefied gas and an outlet side 25 for at least partially evaporated gas, and in conjunction with which the outlet side 25 is connected to an exhaust pipe 6 in such a way as to permit a flow, in conjunction with which the pipe 14 exhibits elements 18 in its interior for the purpose of generating turbulences in the flow or for the purpose of generating a radial separation of the liquid and gaseous phase. A gas interface layer thickness on a wall 23 of the pipe is reduced by the flow turbulences, as a result of which the thermal contact of the liquefied gas with the wall of the pipe is improved. In particular the elements 18 in this case are constituted by baffles 21 in the pipe 14, in particular by profile rods 22 or profile strips extending along the longitudinal axis 19, in conjunction with which the profile rods 22 or the profile strips are advantageously star-shaped, and in particular having at least two radial profiles, preferably at least three radial profiles, and for example at least five radial profiles. The baffles 21 can extend in a twisted fashion along the longitudinal axis 19. The baffles 21 can extend in an undulating fashion along the longitudinal axis 19. The pipe 14 advantageously exhibits a pipe wall 23, and the pipe wall 23 is profiled, and in particular undulating or transposed, along the longitudinal axis 19. The pipe 14 can exhibit an internal pipe cross section which varies along the pipe 14. In particular, the surface of the projection of a first internal cross section of the pipe at a first pipe location 15 onto a second internal cross section of the pipe at a second pipe location 16 is less than 90%, in particular less than 70%, and preferably less than 50%, of the surface of the internal cross section of the pipe. The first and the second pipe locations are displaced by 100 mm along a longitudinal direction of the pipe in this case.

The pipe 14 can exhibit on its outside in particular rolled fins 17, which fins 17 run round in the form of a screw and/or are undulating. The pipe 14 and the elements 18 are made in particular of a homogeneous material, in particular copper, in particular pressed, welded or soldered from a single piece from the external area of the fluid-conducting pipe. Thermally induced distortions are reduced in this way. The elements 18 can divide an internal pipe cross section of the pipe 14 into at least two, in particular at least three, and preferably at least five cross sections of the internal part of the pipe. The ratio of the total surface of the wall to the volume of the pipe is improved in this way. In particular, the cross sections of the internal part of the pipe extend radially outwards. A phase separator 24 for separating liquefied gas from evaporated gas is provided, which is connected to the outlet side 25 in such a way as to permit a flow. The phase separator 24 can be configured as a pressure vessel. The inlet side 26 for the liquefied gas can be arranged geodetically above the outlet side 25 for the at least partially evaporated gas. The heat exchanger 30 advantageously exhibits a resistance heating means 28 wound helically around the pipe 14. Any ice formed on the heat exchanger can be removed in this way. A catch tank 31 for condensate can be provided underneath the pipe 14, in conjunction with which the catch tank 31 in particular exhibits a heating element 32. The heat exchanger 30 can exhibit a heat exchanger housing 29 in particular made of a thermoplastic plastic, which assures the routing of the airflow inside the heat exchanger 30, in conjunction with which in particular a discharge opening 33 is provided, which exhibits arresting edges 34 for the purpose of arresting drops of water. With the help of the arresting edges 34, it is possible to prevent the meltwater from being blown into the flow channels 7 and from being turned into ice there. Advantageously, at least one pressure sensor 35 is provided on the heat exchanger 30 and a means 20 for testing the gas tightness of the cooling system, in particular of the heat exchanger 30, in conjunction with which in particular a temperature sensor 37 is provided on the heat exchanger 30 and is connected electrically to the means 36 for testing the gas tightness. A positive pressure is built up for this purpose in the pipework system for the liquefied gas, and observations are made to establish whether this positive pressure remains stable. A drop in the pressure indicates a leak. The temperature sensors are used to establish whether the liquid gas affecting the pressure measurement is present in the pipe. In order to exclude the possibility of a constant pressure being attributable to a defective supply valve, functional testing of the valves is also performed in the context of the gas tightness testing. This initially relieves the pressure from the volume to be tested and blocks the atmospheric pressure that is present in the test volume. This must not increase, as a leak on the supply side must otherwise be assumed.

With regard to questions of a safety-related nature, and also for reasons of technical efficiency, an advantageous first method for monitoring the gas tightness of a cooling system 45 of a refrigerated vehicle 2 includes the following steps: recording a chronological time sequence of the temperature in at least a first point 46 in the cooling system 45, and determining any change in the temperature in the first point 46 within a first time interval; comparison of the change with a first reference value and triggering of a first warning signal, if the change exceeds the first reference value. With regard to questions of a safety-related nature, and also for reasons of technical efficiency, an advantageous second method for monitoring the gas tightness of a cooling system 45 of a refrigerated vehicle 2 includes the following steps: subjecting a line section 57 of the cooling system 45 to a positive pressure; blocking this line section 57; recording a chronological time sequence of the pressure in at least a second point 47 in the line section 57, and determining any change in the pressure in the second point 47 within a second time interval; comparison of the change with a second reference value and triggering of a second warning signal, if the change exceeds the second reference value, in conjunction with which in particular the method based on a time delay is repeated if the pressure increases.

An additional warning signal is given advantageously if the pressure lies below a set minimum pressure. It is advantageous in this case to combine the first method with the further method, in conjunction with which the further method in particular is implemented if the first warning signal is triggered. The first reference value corresponds advantageously to a fall in temperature of not more than 20° C. per minute, and in particular not more than 10° C. per minute, for example not more than 5° C. per minute. The second reference value corresponds in particular to a fall in pressure of not more than 1 bar per minute, and in particular not more than 0.5 bar per minute, for example not more than 0.2 bar per minute. For a rough test, the first and/or the second time interval exhibits, for example, a chronological duration of between 1 second and 300 seconds, in particular between 50 and 180 seconds, for example between 10 and 60 seconds. For a fine test, the second time interval exhibits, for example, a chronological duration of between 5 minutes and 24 hours, in particular between 30 minutes and 12 hours, for example between 1 hour and 4 hours. The monitoring of the gas tightness can be initiated by turning off the refrigerated vehicle 2. The first and/or second warning signal can be indicated optically and/or acoustically with an indicator instrument 44. Monitoring is initiated and/or carried out in particular during a defrosting phase of the cooling system 45.

It is possible, alternatively or additionally, to monitor the gas tightness of a cooling system 45 according to a method which comprises the following consecutive steps:
a) closing a valve 49 between a tank and at least one of the following elements: a heat exchanger 30 and an evaporator 1 with the at least chronologically identical opening of an additional valve 55, via which a flow-related connection to an exhaust pipe 6 can be produced, and measuring the pressure between the valve 49 and the additional valve 55;

b) closing the additional valve 55, and measuring the pressure between the valve 49 and the additional valve 55;

c) opening the valve 49, and measuring the pressure between the valve 49 and the additional valve 55.

In the case of an intact valve 49 and an intact additional valve 55—assuming an essentially constant temperature—in step a), the measured pressure should correspond to the ambient pressure outside the cooling system, usually atmospheric pressure. In step b), the measured pressure should be chronologically constant, whereas in step c), an increase in pressure up to an equilibrium pressure and then an essentially constant pressure should be measured. These pressures can be compared in particular with reference values that are capable of being set, in order to enable an error function of the valves 49, 55 to be detected.

A particularly advantageous method for operating a cooling system 45 of a refrigerated vehicle 2, having at least one refrigerated chamber 4, 9, comprises at least one of the two methods for testing the gas tightness of the cooling system 45, in conjunction with which in particular the cooling system 45 exhibits a ventilator 8, and the ventilator 8 is switched on when a door 48 of the refrigerated chamber 4, 9 is opened.

A particularly advantageous cooling system 45 for a refrigerated vehicle 2 comprises at least one tank for liquefied gas, at least one evaporator 1 and one means 20 for testing the gas tightness of the cooling system 45 with at least one temperature sensor 37 and/or at least one pressure sensor 35 for performing at least one of the two methods for testing the gas tightness of the cooling system 45, in conjunction with which in particular a refrigerated chamber 4, 9 is provided with a door 48 and a ventilator 8, and the ventilator 48 is taken into service as soon as the door 48 is opened. In particular, the ventilator 8 is taken into service when a gas leak is detected and the door 48 of the refrigerated chamber 4, 9 is opened.

A particularly advantageous refrigerated vehicle 2 includes the cooling system 45 described above.

The invention relates to a device and a method for generating a positive pressure in a tank 5 for liquefied gas on a refrigerated vehicle 2 with an evaporator 1 for the liquefied gas, in conjunction with which the evaporator 1 is connected in a fluid-conducting fashion to the tank 5 via a line 42 for liquefied gas, and in conjunction with which a valve 49 is arranged in the line 42, and comprises the following method steps: opening the valve 49 so that liquefied gas exits from the tank 5 and into the line 42; closing the valve 49 in such a way that a quantity of the liquefied gas remains in the line 42 and is able to flow back into the tank 5; heating the quantity in the line 42. The invention also relates to a method for the supply of liquefied gas, and a device for generating a positive pressure in a tank for liquefied gas in a cooling system, in conjunction with which the method according to the invention for generating a pressure is utilized. The invention permits a particularly efficient and reliable cooling of products in a refrigerated vehicle.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

LIST OF REFERENCE DESIGNATIONS

1 Evaporator
2 Refrigerated vehicle
3 Refrigerated chamber housing
4 Refrigerated chamber
5 Tank
6 Exhaust gas pipe
7 Flow channels
8 Ventilator
9 Refrigerated chamber
10 Refrigeration module
11 Upper area
12 Lower area
13 Pressure build-up means
14 Pipe
15 First pipe location
16 Second pipe location
17 Fins
18 Elements
19 Longitudinal axis
20 Means for testing the gas tightness of the heat exchanger 30 and the evaporator 1
21 Baffles
22 Profile rods
23 Pipe wall
24 Phase separator
25 Outlet side
26 Inlet side
27 Refrigerated cooled air
28 Resistance heating
29 Heat exchanger housing
30 Heat exchanger
31 Catch tank
32 Heating element
33 Discharge opening
34 Arresting edges
35 Pressure sensor
36 Supply line for phase separator 24
37 Temperature sensor
38 Pressure control
39 Cooling air for cooling
40 Return line for phase separator 24
41 Swirl structure
42 Line for liquefied gas
43 Electrical line
44 Indicator instrument
45 Cooling system
46 First position
47 Second position
48 Door
49 Valve
50 Face
51 Thermal bridge
52 Motor for ventilator
53 Temperature sensor
54 Direction of flow of liquefied gas
55 Additional valve
56 Exhaust gas
57 Line section

What is claimed is:

1. A method for generating a positive pressure in a tank for liquefied gas on a refrigerated vehicle with an evaporator for the liquefied gas, in conjunction with which the evaporator is connected in a fluid-conducting fashion to the tank via a line for liquefied gas, and in conjunction with which a valve is arranged in the line, comprising the following method steps:

opening the valve so that liquefied gas exits from the tank and into the line;

allowing at least some of the liquefied gas in the line to enter the evaporator;

blowing air across the evaporator to chill the air;

directing the chilled air into a refrigerated chamber of the vehicle that contains goods to be chilled;

closing the valve, in conjunction with which a quantity of the liquefied gas remains in the line and is able to flow back into the tank;

heating the quantity in the line.

2. The method of claim 1, wherein the quantity in the line is heated in such a way that the quantity is caused to evaporate at least partially.

3. The method of claim 1, wherein, at the time of closing the valve, in the line upstream of the valve, a volume of liquefied gas of at least $1/1500$ of the volume of the tank is enclosed.

4. The method of claim 1, wherein at least 10% of the quantity of liquefied gas remaining in the line is caused to evaporate by the heating process.

5. The method of claim 1, wherein the heating takes place by means of environmental heat on the line.

6. The method of claim 1, wherein, at the time of closing the valve, in the line upstream of the valve, a volume of liquefied gas of at least $1/700$ of the volume of the tank is enclosed.

7. The method of claim 1, wherein, at the time of closing the valve, in the line upstream of the valve, a volume of liquefied gas of at least $1/300$ of the volume of the tank is enclosed.

8. The method of claim 1, wherein at least 20% of the quantity of liquefied gas remaining in the line is caused to evaporate by the heating process.

9. The method of claim 1, wherein at least 50% of the quantity of liquefied gas remaining in the line is caused to evaporate by the heating process.

10. The method of claim 1, wherein at least 80% of the quantity of liquefied gas remaining in the line is caused to evaporate by the heating process.

11. The method of claim 1, further comprising the step of opening the valve and allowing the liquefied gas to be forced by the positive pressure into the evaporator.

12. The method of claim 11, wherein the valve is opened in a pulsating fashion.

13. The method of claim 1, wherein the line comprises a thermal bridge upstream of the valve.

\* \* \* \* \*